United States Patent
Hsieh et al.

(10) Patent No.: US 8,063,981 B2
(45) Date of Patent: Nov. 22, 2011

(54) CAMERA DEVICE ADAPTING TO DIFFERENT LENS SENSORS

(75) Inventors: Ming-Chih Hsieh, Taipei Hsien (TW); Tsung-Hsi Li, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 157 days.

(21) Appl. No.: 12/699,849

(22) Filed: Feb. 3, 2010

(65) Prior Publication Data
US 2011/0170000 A1    Jul. 14, 2011

(30) Foreign Application Priority Data

Jan. 14, 2010 (TW) ................ 99100875 A

(51) Int. Cl.
*H04N 5/225* (2006.01)
(52) U.S. Cl. ......... 348/373; 348/374; 348/375; 348/376
(58) Field of Classification Search .......... 348/373–376; 396/535–541; 257/290–292, 678, 80–85, 257/432–435, 440; 250/208.1, 239; 438/144, 438/145
See application file for complete search history.

(56) References Cited

U.S. PATENT DOCUMENTS

| 4,390,220 A | * | 6/1983 | Benasutti | 439/71 |
| 5,783,815 A | * | 7/1998 | Ikeda | 250/208.1 |
| 7,848,638 B2 | * | 12/2010 | Senba | 396/535 |
| 2005/0052568 A1 | * | 3/2005 | Tan et al. | 348/374 |
| 2009/0136228 A1 | * | 5/2009 | Mayumi | 396/535 |

* cited by examiner

*Primary Examiner* — Yogesh Aggarwal

(57) ABSTRACT

A camera device includes a lens cover defining a lens opening. Two positioning posts extend from the lens cover. The two positioning posts are arranged at two opposite sides of the lens opening, for selectively mounting a first circuit board having a first lens or a second circuit board having a second lens different from the first lens. The first and second circuit boards are operable to be installed on the lens cover at different positions through being mounted on different positions of the two positioning posts.

2 Claims, 5 Drawing Sheets

CAMERA DEVICE ADAPTING TO DIFFERENT LENS SENSORS

BACKGROUND

1. Technical Field

The present disclosure relates to camera devices and, particularly, to a camera device which is capable of adapting to two different lens having different lens sensors.

2. Description of Related Art

Camera devices, such as digital cameras, generally include lens sensors installed on circuit boards of the camera devices. Types of the lens sensors may be different, such as a charge coupled device lens sensors and complementary metal-oxide-semiconductor transistor lens sensors. Currently, different lens sensors must be installed in different lens covers to match different back focal lengths, therefore, when a lens sensor needs to be replaced, the lens cover must be replaced, too, which is costly.

DETAILED DESCRIPTION

Figure 1:
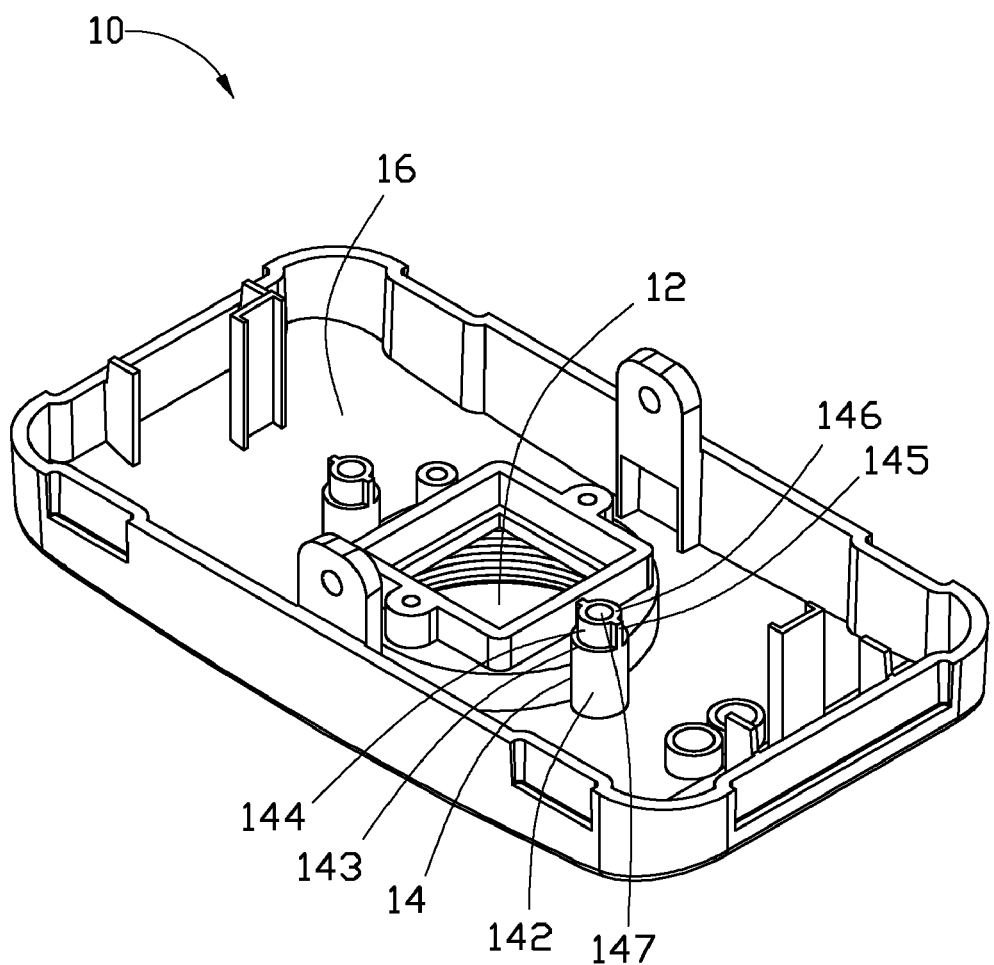
FIG. 1 is an isometric, schematic view of an exemplary embodiment of a lens cover of a camera device.

Referring to FIG. 1, an exemplary embodiment of a camera device includes a lens cover 10. It may be understood that the camera device also includes other parts, such as a back cover, a battery, and some memory cards, for example. Those other parts fall within well-known technologies, and are therefore not described here.

The lens cover 10 defines a lens opening 12 for installing a lens (not shown). Two column-shaped positioning posts 14 are arranged on two opposite sides of the lens opening 12. Each positioning post 14 includes a first positioning pole 142 perpendicularly extending from an inner wall 16 of the lens cover 10, and a second positioning pole 144 extending from a distal end of the first positioning pole 142. The radius of the first positioning pole 142 is greater than the radius of the second positioning pole 144. Two longitudinal stop portions 145 symmetrically extend from a circumference of the second positioning pole 144, along an axial direction of the second positioning pole 144. A threaded screw hole 147 is defined in the second positioning pole 144.

A length between the inner wall 16 and a top surface 143 of the first positioning pole 142 satisfies the back focal length requirement of a first circuit board 20 (see FIG. 2), which installs a first lens sensor such as a complementary metal-oxide-semiconductor transistor (CMOS) lens sensor (not shown). A length between the inner wall 16 and a top surface 146 of the second position pole 144 satisfies the back focal length requirement of a second circuit board 30 (see FIG. 4), which installs a second lens sensor such as a charge coupled device (CCD) lens sensor (not shown).

Figure 2:
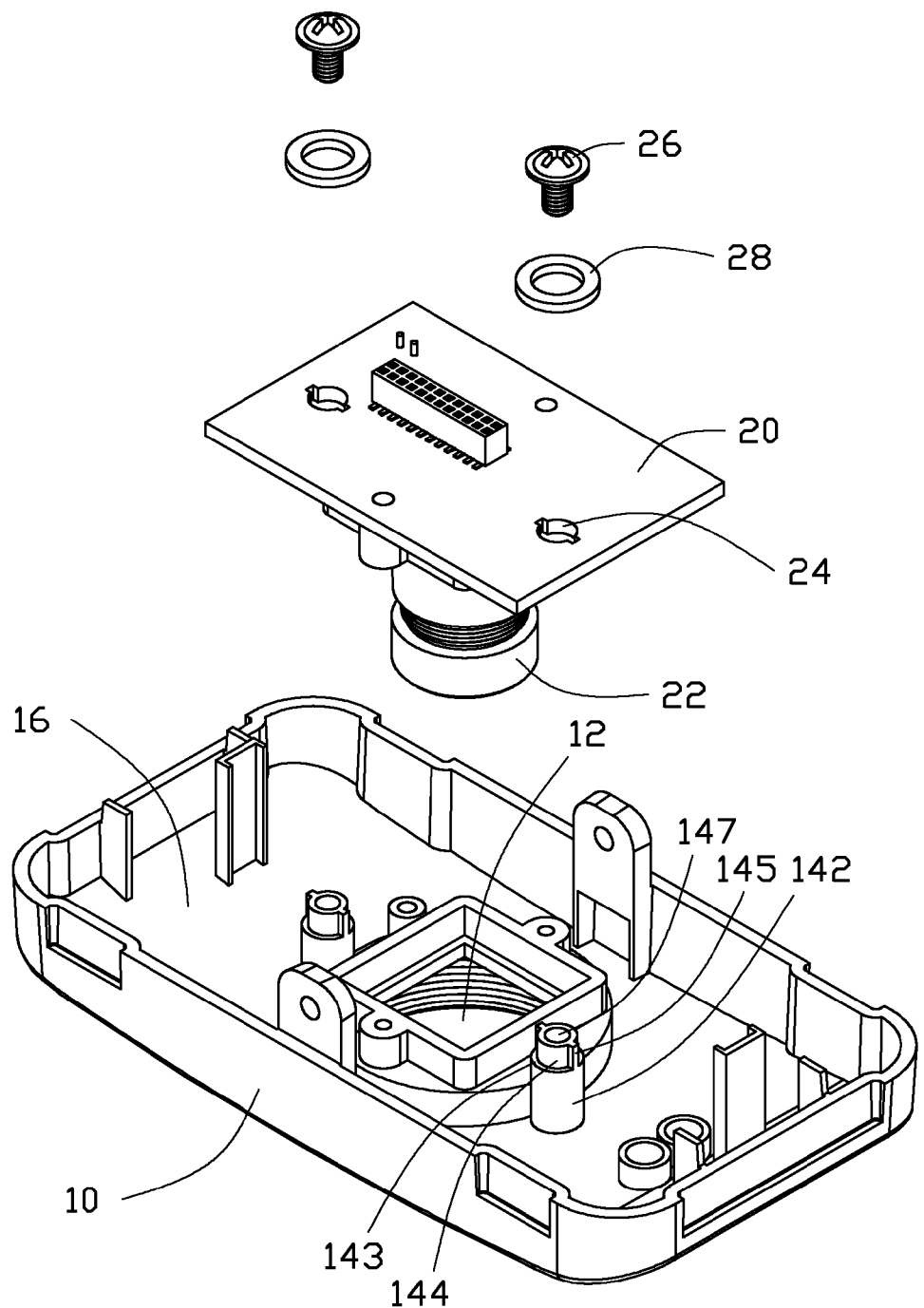
FIG. 2 is an exploded, isometric view of the lens cover of FIG. 1, together with a first circuit board having a complementary metal-oxide-semiconductor transistor lens sensor.
Figure 3:
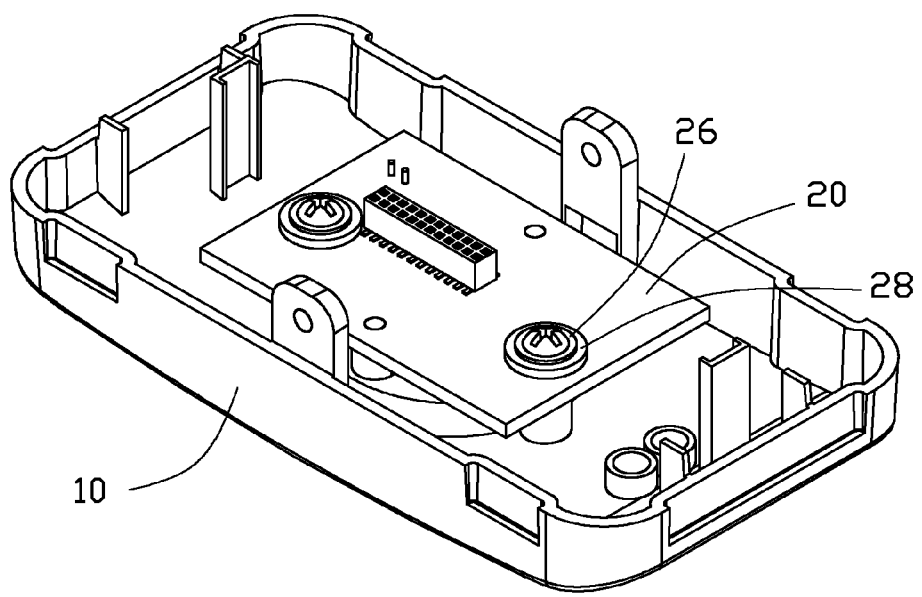
FIG. 3 is an assembled view of FIG. 2.

Referring to FIGS. 2 and 3, the first circuit board 20 includes a CMOS lens 22 which holds the CMOS lens sensor. The first circuit board 20 defines two through holes 24 corresponding to the two positioning posts 14. A shape of each through hole 24 matches that of the second positioning pole 144 and the longitudinal stop portions 145 of a corresponding positioning post 14 can be inserted into the through hole 24, and is sized in order to stop the corresponding first positioning pole 142 from being inserted into the through hole 24.

In assembly, the first positioning poles 144 and the longitudinal stop portions 145 are inserted into the corresponding through holes 24. Two fasteners, such as screws 26, extend through two washers 28 and screw in the corresponding screw holes 147, therefore the first circuit board 20 is fixed on the lens cover 10. A distance between the first circuit board 20 and the inner wall 16 is equal to the length between the inner wall 16 and the top surface 143 of the first positioning pole 142, therefore the CMOS lens 22 has a proper back focal length.

Figure 4:
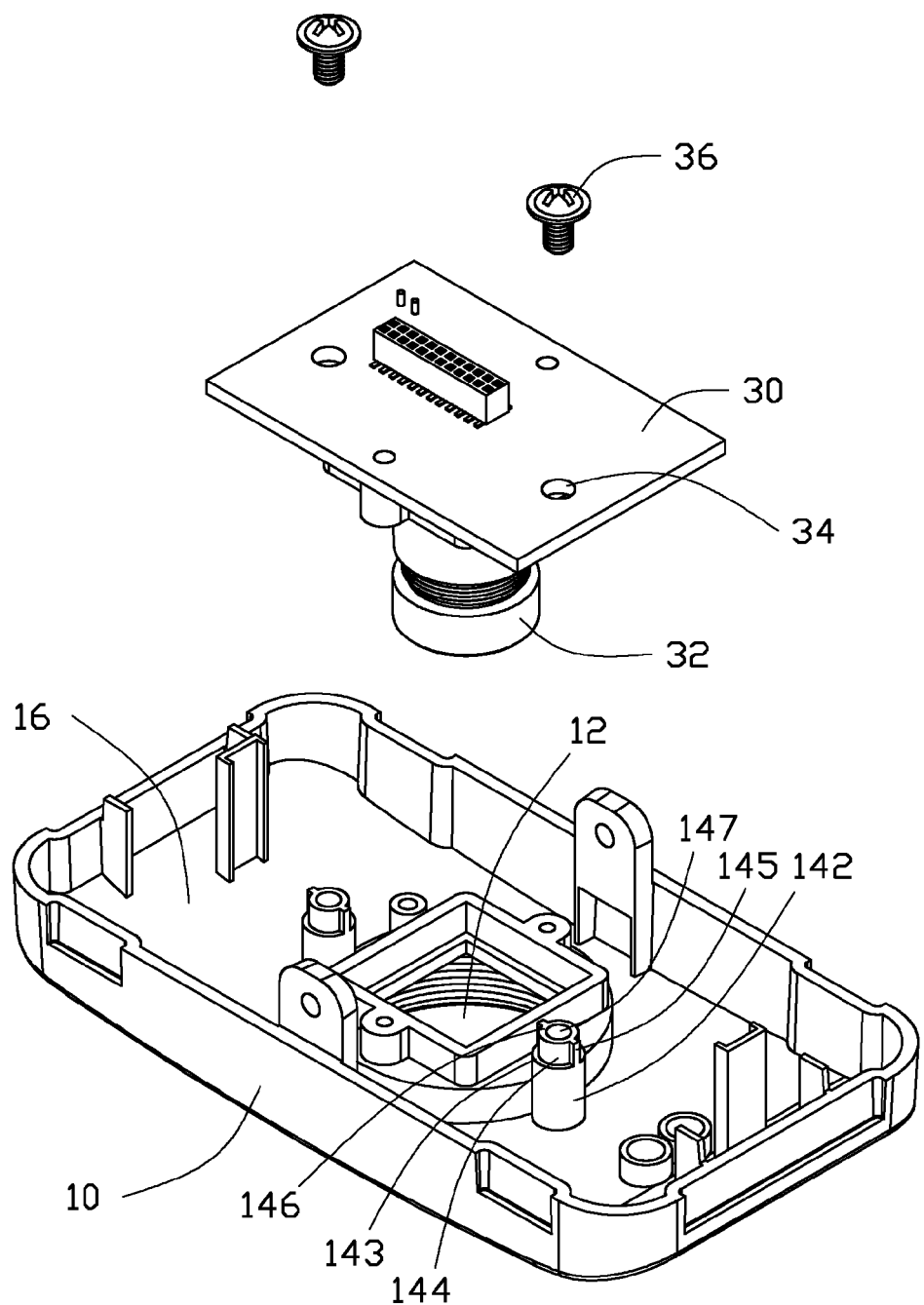
FIG. 4 is an exploded, isometric view of the lens cover of FIG. 1, together with a second circuit board having a charge coupled device lens sensor.
Figure 5:
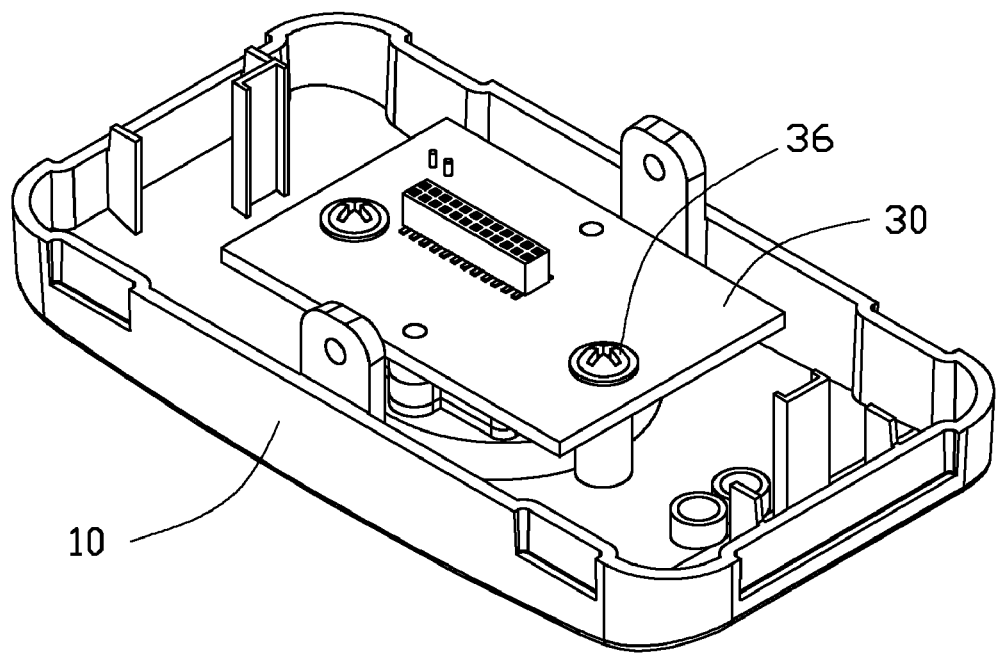
FIG. 5 is an assembled view of FIG. 4.

Referring to FIGS. 4 and 5, the second circuit board 30 includes a CCD lens 32 which holds the CCD lens sensor. The second circuit board 30 defines two through holes 34 corresponding to the two positioning posts 14. A shape of each through hole 34 matches that the second positioning pole 144 and the longitudinal stop portion 145 of a corresponding positioning post 14 cannot be inserted into the through hole 34.

In assembly, two fasteners, such as screws 36, are screwed into the screw holes 147, therefore the second circuit board 30 is fixed on the lens cover 10. A distance between the second circuit board 30 and the inner wall 16 is equal to the length between the inner wall 16 and the top surface 146 of the second positioning pole 144, therefore the CCD lens 32 has a proper back focal length.

The lens cover 10 can selectively install two different circuit boards 20 and 30 having different lens sensors, and make the back focal lengths of the lens sensors each have a proper back focal length, which can reduce costs.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A camera device comprising:
   a lens cover defining a lens opening; and
   two positioning posts arranged at two opposite sides of the lens opening for selectively mounting a first circuit board having a first lens or a second circuit board having a second lens different from the first lens;
   wherein each of the two positioning posts includes a first positioning pole perpendicularly extending from an inner wall of the lens cover, and a second positioning pole extending from a distal end of the first positioning pole, a transverse size of the first positioning pole is greater than a transverse size of the second positioning pole, at least one stop portion extends from a circumference of the second positioning pole, a threaded screw hole is defined in the second positioning pole;
   wherein the second positioning poles and the stop portions of the two positioning posts are operable to be inserted into two through holes of the first circuit board and the first positioning poles are blocked by the two through holes of the first circuit board, in response to the first circuit board being fixed on the lens cover through fasteners engaging in the screw holes; and wherein the second positioning poles are blocked by two through holes of the second circuit board, in response to the second circuit board being fixed on the lens cover through fasteners engaging in the screw holes.

2. The camera device of claim 1, wherein the at least one stop portion of each positioning post comprises two longitudinal stop portions symmetrically extending from the circumference of the second positioning pole.

* * * * *